T. L. RANKIN.
Ice-Making Apparatus.
No. 220,420. Patented Oct. 7, 1879.
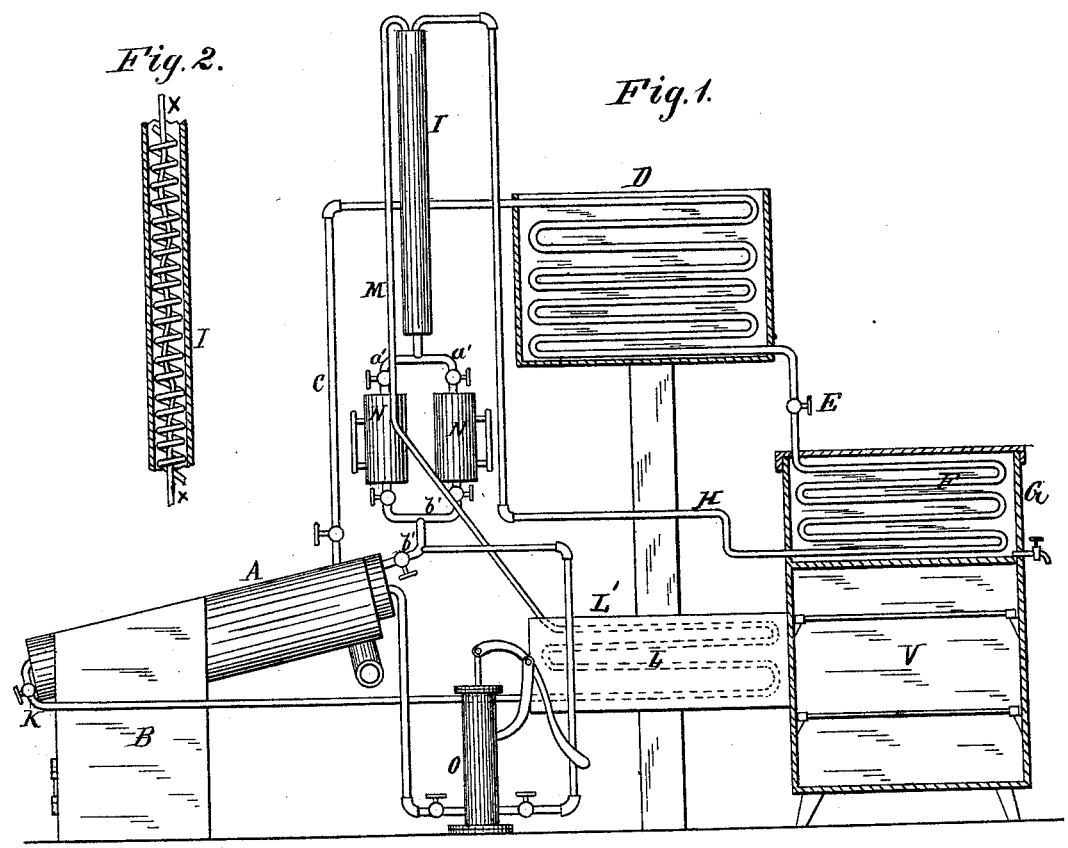

UNITED STATES PATENT OFFICE.

THOMAS L. RANKIN, OF LYNDON, KANSAS.

IMPROVEMENT IN ICE-MAKING APPARATUS.

Specification forming part of Letters Patent No. 220,420, dated October 7, 1879; application filed April 4, 1879.

*To all whom it may concern:*

Be it known that I, THOMAS L. RANKIN, of Lyndon, in the county of Osage and State of Kansas, have invented a new and Improved Ice-Making Apparatus, of which the following is a specification.

Figure 1 is an elevation of the apparatus, partly in section. Fig. 2 is a sectional elevation of the absorber I and aqueous-vapor condenser C.

Similar letters of reference indicate corresponding parts.

The object of this invention is to furnish for domestic purposes a refrigerating and ice-producing apparatus.

The invention consists in the combination, with an inclined still, of piping, receiving-chamber, and absorber, as hereinafter described.

The boiler or still A is preferably constructed of lap-welded pipe, which is filled with strong aqua ammonia and fixed over or in the furnace B. When heat is applied to the boiler the ammoniacal gas rises through the aqueous-vapor-condenser pipe C, down which a stream of water is kept flowing for the purpose of condensing any steam that may be passing off with the gas, and causing it to return to the boiler. The gas, passing in a reasonably dry condition to the condenser D, accumulates there to the liquefying-point, which may range from eighty to one hundred and sixty pounds pressure, or thereabout, according to the temperature of the water used upon the condenser-pipe, and according to the pressure in the boiler. Thus the gas is liquefied by its own pressure, and presses against the valve E, which was closed at the beginning of the process. To determine when the liquefying-point of the gas has been reached, the valve E may be opened a little, when the pipe below it will at once become frosted on the outside if this condition has arrived. Then, the valve E being allowed to remain open a little, the liquefied gas is expanded in the coil F, taking from the water that surrounds the coil in the box G the heat that is required for its expansion. Passing out, then, through the pipe H at a pressure of from fifteen to twenty-five pounds, or thereabout, the gas flows to the absorber I, which is fitted with a coil of wire, X, for the better conduction of the absorbed heat to the surface of the absorber, whence it can be removed by the stream of water flowing over it. Here in the absorber I the expanded gas meets a stream of weak aqua ammonia from the boiler, which flows thence through valve and pipe K into the cooling-coil L, that is surrounded with water in the box L', for the purpose of becoming cooled to a point that will absorb the most gas, and thence through pipe M up to the meeting-point of the gas at the top of the absorber. From this point the liquid flows down through the absorber and through pipes $a'$ $a'$ to the chambers N N, from each of which it is let out alternately to flow back into the still or boiler by the opening of the lower and the closing of the top valve. The top valve of one of the chambers being closed, the lower one is opened, when the hot and expanded gas from the boiler rushes in through the pipes $b$ $b'$, and, heating the contained strong aqua-ammonia, creates a pressure in the chamber sufficient to empty the contents of the chamber through the pipes $b'$ $b'$ into the boiler before much gas has been given off. The lower valve of this chamber is then closed and the upper one opened, and the contents of the other chamber may be returned to the boiler in the same manner; and so the operation may go on indefinitely. Meanwhile the main volume of the gas from the boiler is passing in the usual way to the condenser and throughout the circulatory system, as has been described.

The valves in the pipes $a'$ $a'$ and $b'$ $b'$ are worked automatically.

By this device the use of a pump in so-called "absorption ice-making apparatus" for returning the liquid to the boiler is obviated. No machinery whatever is required for the purpose, as the liquids move simply by their own pressure throughout the entire system so long as the proper temperature is maintained under the boiler. The process is so simple that it can be understood and operated by any person who has once seen it.

There is shown in the drawings a common plunger-pump, O, having connecting-pipes with the boiler and pipe $b'$. When it is desired to make ice more rapidly the pump may be used and operated continuously to move the liquid from the absorber to the boiler.

The box G is a galvanized-iron chamber, with inclined bottom to carry off the condensed moisture, placed immediately over the rear part of a refrigerator-box, V.

When the water in G is reduced to 32° Fahrenheit without making the whole into ice, the box will receive and impart to its contents the same benefits of cooling for the surface used as if ice were melted, and at the same time ice may be formed upon the coils F of any thickness desirable, to hold this water at a temperature for drinking purposes or the protection of the contents of the box.

Having thus fully described my invention, I claim as new and desire to secure by Letters Patent—

In an ice-making apparatus, the combination, with an inclined cylindrical still, A, of the piping $b'$, the receiving-chambers N N, the piping $a'$, and the absorber I, as shown and described.

THOMAS L. RANKIN.

Witnesses:
  C. SEDGWICK,
  I. I. STORER.